US011260962B1

(12) United States Patent
Chen

(10) Patent No.: US 11,260,962 B1
(45) Date of Patent: Mar. 1, 2022

(54) CENTRIFUGAL-FORCE-PROPULSION AND CONTROL SYSTEM (CFPANDCS) AND APPLICATIONS

(71) Applicant: Franklin Y. K. Chen, Northport, NY (US)

(72) Inventor: Franklin Y. K. Chen, Northport, NY (US)

( * ) Notice: Subject to any disclaimer, the term of this patent is extended or adjusted under 35 U.S.C. 154(b) by 0 days.

(21) Appl. No.: 16/797,900

(22) Filed: Feb. 21, 2020

Related U.S. Application Data

(60) Provisional application No. 62/810,689, filed on Feb. 26, 2019.

(51) Int. Cl.
| | | |
|---|---|---|
| *B64C 17/06* | (2006.01) | |
| *B64D 27/16* | (2006.01) | |
| *B64C 15/02* | (2006.01) | |
| *G01M 1/36* | (2006.01) | |

(52) U.S. Cl.
CPC .............. *B64C 17/06* (2013.01); *B64C 15/02* (2013.01); *B64D 27/16* (2013.01); *G01M 1/36* (2013.01)

(58) Field of Classification Search
CPC ......... B64C 17/06; B64C 15/02; B64D 27/16; G01M 1/36
See application file for complete search history.

(56) References Cited

U.S. PATENT DOCUMENTS

| | | | | |
|---|---|---|---|---|
| 6,345,789 B1* | 2/2002 | Rasmusson | ............ | B64G 1/409 244/171.5 |
| 9,995,284 B1* | 6/2018 | Gutsche | ................... | B60K 1/00 |
| 2001/0032522 A1* | 10/2001 | Davis, Jr. | .................. | F03G 7/10 74/84 S |
| 2005/0115341 A1* | 6/2005 | Partanen | ................... | F03G 3/00 74/84 S |
| 2005/0247145 A1* | 11/2005 | LeGoff | ...................... | F03G 7/00 74/84 S |
| 2006/0070488 A1* | 4/2006 | Tavarez | .................... | F03G 3/00 74/570.1 |
| 2006/0226696 A1* | 10/2006 | Jones | ...................... | F16F 15/36 301/5.22 |
| 2008/0000324 A1* | 1/2008 | Biro | .......................... | F03G 3/08 74/84 R |
| 2010/0009831 A1* | 1/2010 | Ryu | ......................... | G01M 1/36 494/8 |
| 2010/0009833 A1* | 1/2010 | Ryu | ........................ | B04B 9/146 494/9 |

* cited by examiner

*Primary Examiner* — Assres H Woldemaryam
(74) *Attorney, Agent, or Firm* — Edwin D. Schindler

(57) ABSTRACT

This invention presents a unique propulsion and maneuver-control system for crafts and devices. This invention develops its desired thrust force vectors from the vectors sum of centrifugal force vectors of rotating masses and their controlled gyroscopic force vectors. Also shown are applications of this propulsion and maneuver-control system for future VTOL-Hovering-Flying crafts, Scooters, Surfboards, marine/submarine-crafts, earth, moon, mars satellites disks and space-crafts. This invention has great potentials of creating new businesses in aerospace markets, all planets' weather modification business, bring people of the world closer together and perform critical tasks of modify trajectories to prevent run-away asteroids from hitting the earth.

3 Claims, 12 Drawing Sheets

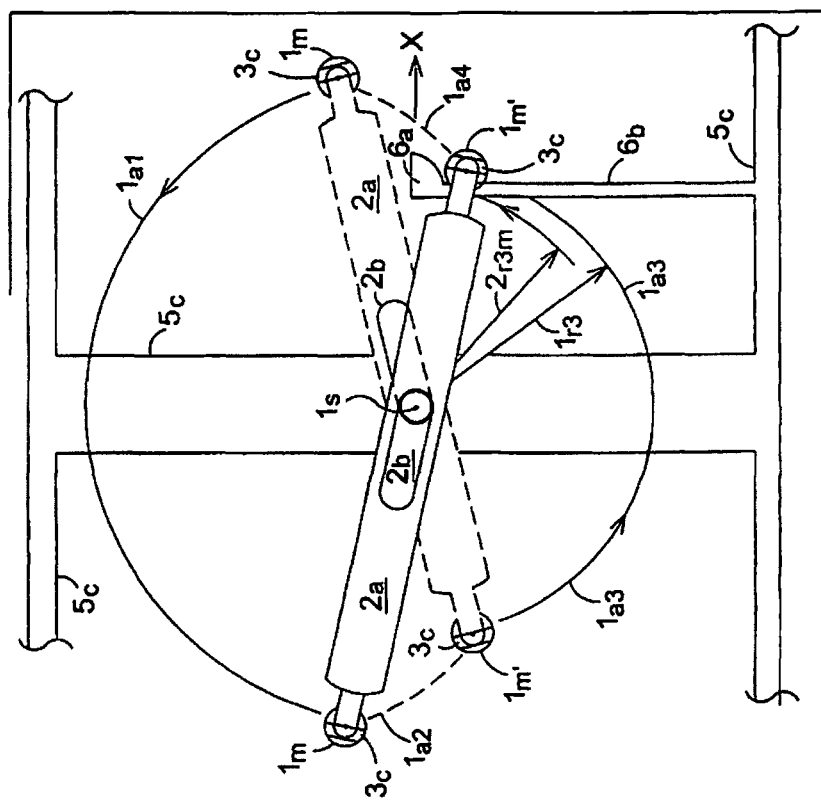
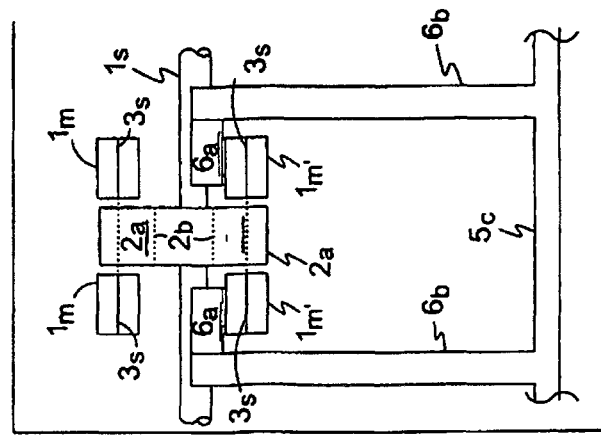
FIG. 6A
FIG. 6B

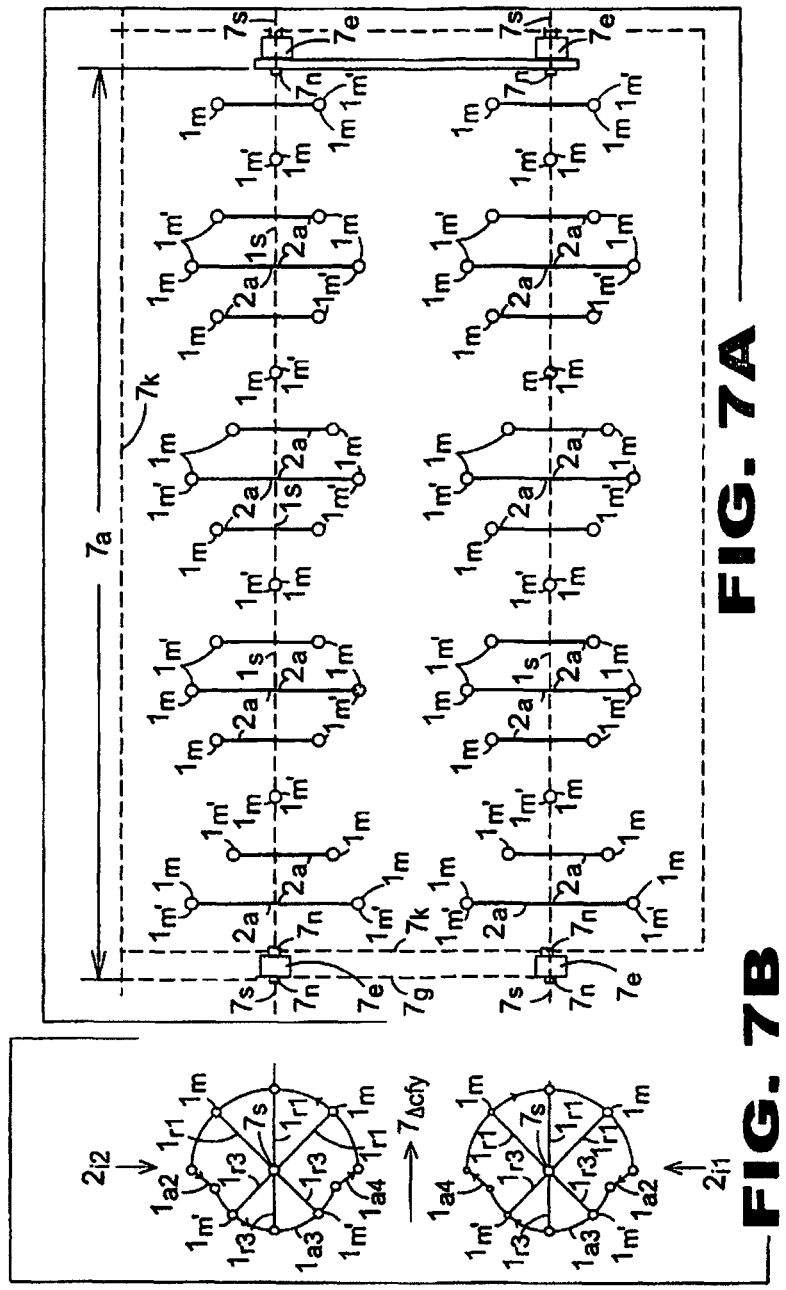

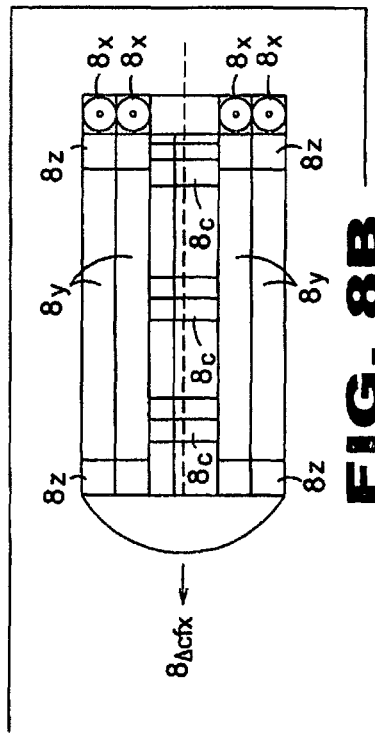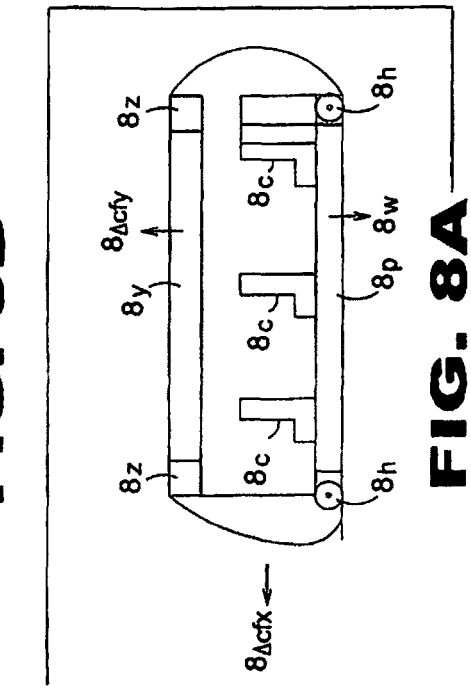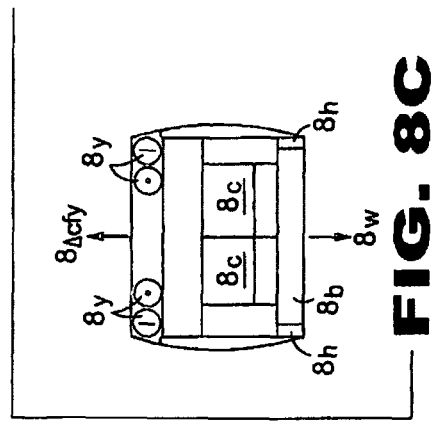

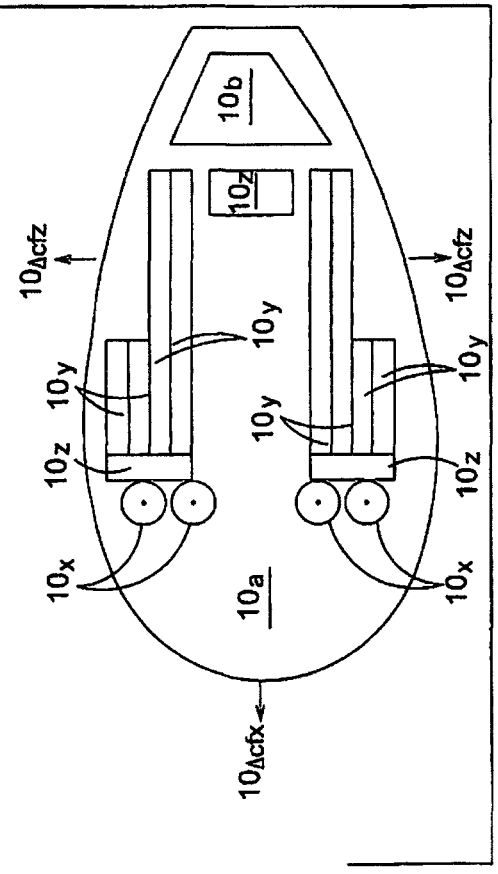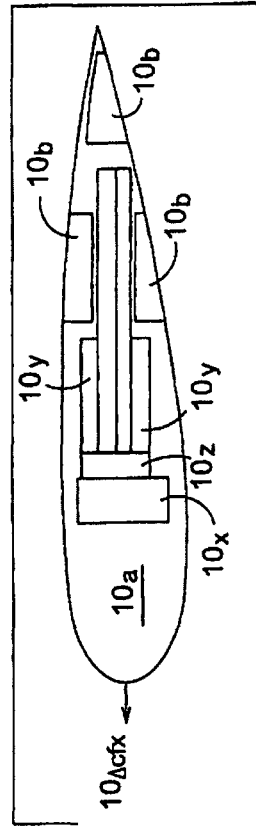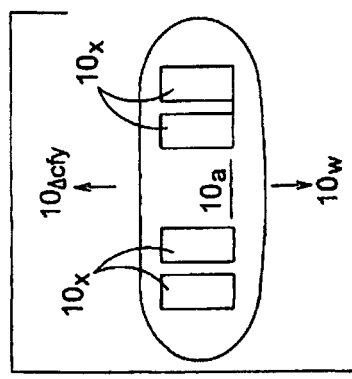

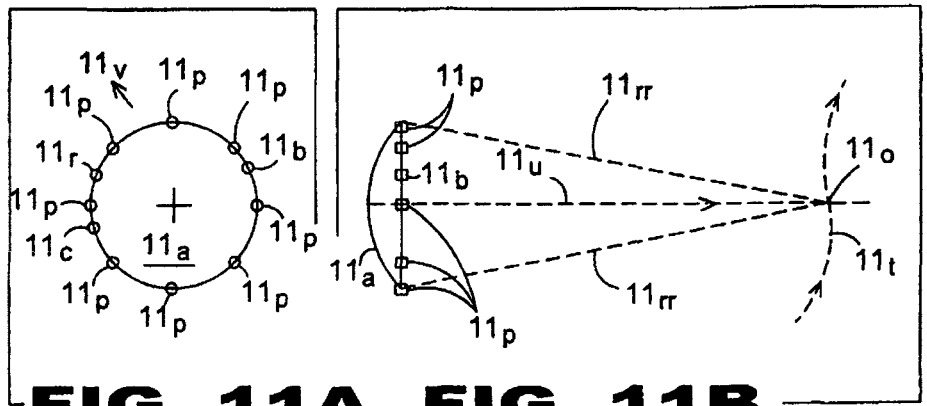
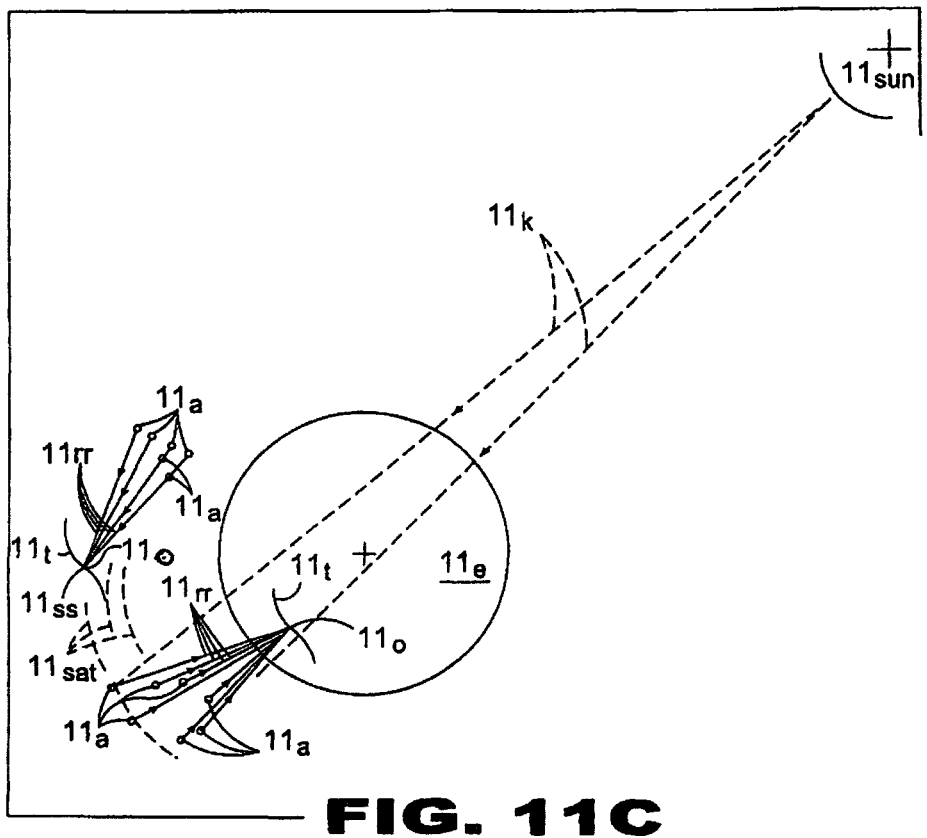

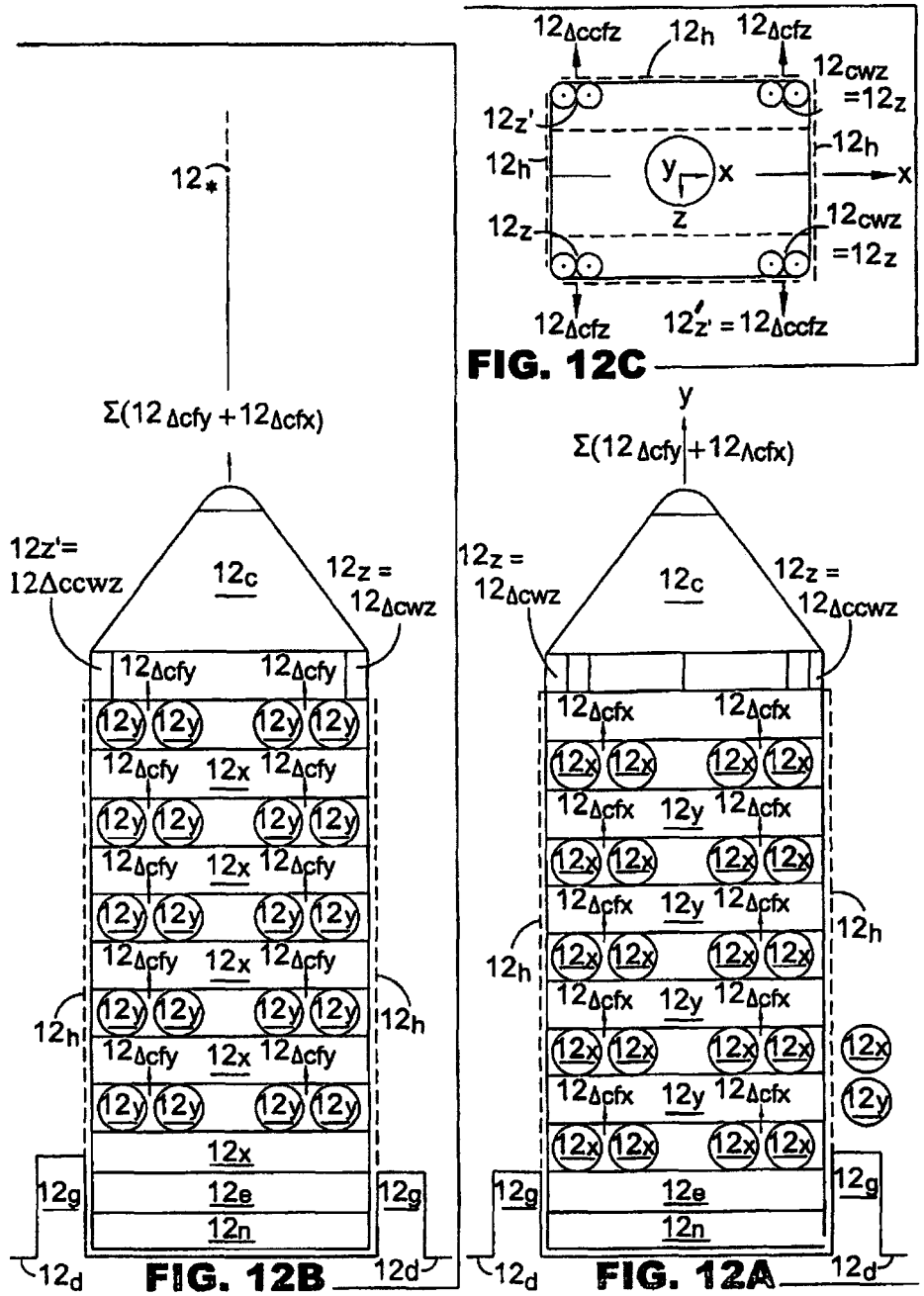

CENTRIFUGAL-FORCE-PROPULSION AND CONTROL SYSTEM (CFPANDCS) AND APPLICATIONS

RELATED APPLICATION

Domestic priority is claimed, pursuant to 35 U.S.C. § 119(e), from U.S. Provisional Patent Application Ser. No. 62/810,869, filed Feb. 26, 2019, the entire contents of which are incorporated by reference herein.

BACKGROUND OF THE INVENTION

Field of the Invention

This invention presents a unique propulsion and maneuver-control system for crafts and devices. This invention develops its desired thrust force vectors from the vectors sum of centrifugal force vectors of rotating masses and any gyroscopic force vectors. Also shown are applications of this propulsion and maneuver-control system for future VTOL-Hovering-Flying crafts, Scooters, Surfboards, marine/submarine-crafts, satellites and space-crafts. This invention has great potentials of creating new businesses in aerospace markets, earth weather modification business and perform critical tasks of modify trajectories to prevent run-away asteroids from hitting the earth. This has the potential to bring the world's people together.

DESCRIPTION OF THE PRIOR ART

The Prior art depends on reaction forces from fast-moving fluid, mass, or charged particles exhaust from the system. The desired thrust of this proposed CFP&CS/iCFP&CS depends on the unbalanced counter-rotating masses' centrifugal force vectors in combination with any existing gyroscopic forces from these rotating masses for vehicle maneuvers.

No fluid or mass exhaust out of the CFP&CS/iCFP&CS. The CFP&CS's & iCFP&CS's propulsion force magnitudes and directions controls are designed by selectively changing a few different CFP&CSs' axial attitude orientations and/or their RPMs. These iCFP&CS parameters can be scaled up or down to satisfy current and future crafts requirements. iCFP&CS equipped crafts can operate or park safely and quietly in close space. The prior arts systems cannot offer these advantages to their crafts.

Included herein as reference material are prior art patent application, publications and Internet accessible websites used in preparation and support of the Instant Invention. U.S. Pat. No. 5,762,298 issued to Franklin Y. K. Chen on Jun. 9, 1998.

Another patent was issued to Franklin Y. K. Chen on Nov. 16, 1999 as U.S. Pat. No. 5,984,239. Yet another U.S. Pat. No. 6,045,089 was issued to Franklin Y. K. Chen on Apr. 4, 2000 and still yet another was issued on Nov. 17, 2015 to Franklin Y. K. Chen as U.S. Pat. No. 9,187,175.

Proceeding of the Fourteenth SSI Princeton Conference on Space Manufacturing Challenges & Opportunities in Space 12. By Franklin K. Chen, pp. 204-212. May 6-9, 1999. ISBN 0-9622379-2.

Coriolis Vibratory Gyroscopes: Theory and Design by Vladislav Apostolyuk ISBN: 978-3-319-22197-7.

Wikipedia Website; Article "Centrifugal force".

Aviation Week & Space Technology
 July-August 2018
 Article: Electric Aircraft Motor Developer—p 37;
 Article: Teams prep for Key Space Electric Propulsion Tests—p 47
 Article: Dynamics to Propel Astrobotic's Commercial Lander To the Moon—p 51
 Sep. 7-30, 2018
 Article: New Generation of Electric Thrusters—p 26
 Dec. 10-23, 2018
 Article: MIT UAV Achieves First Flight with Solid-State Propulsion: Electrodynamic EAD Propulsion—p 28.

YouTube Website—Channel: 1veritasium Video: Gyroscopic Precession.

Wikipedia.org: Intermediate Axis Theorem.

SUMMARY OF THE PRESENT INVENTION

This invention is labeled either as Centrifugal-Force-Propulsion-&-Control-System (CFP&CS) or as Independent-Centrifugal-Force-Propulsion-&-Control-System (iCFP&CS). iCFP&CS has more than one independent CFP&CSs. This basic iCFP&CS derives its thrust vectors and controls using the following basic concepts and schemes:

(1) iCFP&CS derives its unbalanced centrifugal forces components vectors from each identical pair of masses 180 degrees apart on a rotating arm $2_a$ diameter tips moving on an asymmetrical closed loop track $1_a$.

Each pair of identical rotating masses are labeled differently as $1_m$ and $1_{m'}$ when they are at their different rotating radii $1_{r.max}$ or $1_{r.min}$ respectively on opposite $2_a$ ends rotating on asymmetrical rotating track $1_a$.

(2) Special methods listed below are used to produce impulse force vectors $2_{i1}$ and $2_{i2}$ at specified $1_a$ track locations $1_{a2}$ and $1_{a4}$ respectively to simultaneous changing both rotation radii of both masses $1_m$ and $1_{m'}$ on the same MRA $2_a$.

Method A, a protruding controllable physical bump $6_a$ is location fixed near the starting point of track $1_{a4}$. When the fast rotating $1_{m'}$ in contact with this bump $6_a$, the impulsive force $2_{i2}$ from $6_a$ will push $1_{m'}$ out from its $1_{r.min}$ radius on track $1_{a3}$ towards $1_{r.max}$ inside tracks $1_{a4}$ and then continue moving it towards track $1_{a1}$. At this same time, the mass $1_m$, on the same MHA $2_a$, will reducing its radius from $1_{r.max}$ to $1_{r.min}$ inside track $1_{a2}$.

Method B, simultaneously a continuous high-pressure fluid jet $1_{j1}$ (shown as $2_{i1}$) fixed at tracks $1_{a2}$ designed to push on the fast rotating $1_m$ when it passes $1_{j1}$ it will be pushed to decrease its radius from $1_{r.max}$ towards $1_{r.min}$.

Instead using fluid jets, magnetic and electrical magnetic forces $2_{e1}$ and $2_{e2}$ may be used to produce the same required $t_{i1}$ (as $2_{e1}$) and $2_{i2}$ (as $2_{e2}$) impulsive forces.

NOTE: Actual tests will determine the best $6_a$ shape, rate of $6_a$ protrusion and best $6_a$ location(s). Also, test must be conducted to determine the pressure levels and pointing directions of fluid jets $2_{j1}$ and $2_{j2}$ for different rotating mass sizes and shapes at different RPMs.

The asymmetrical track $1_a$ is divided into four tracks. Labeled as $1_{a1}$, $1_{a2}$, $1_{a3}$ and $1_{a4}$. Track $1_{a1}$ is the large half-circle shaped track above x-axis with its radius labeled $1_{r.max}$ and the mass on $1_{a1}$ is labeled $1_m$. Track $1_{a3}$ is the smaller half-circle shaped track below x-axis and its radius is labeled $1r.min$ and the mass on $1_{a3}$ is labeled $1_{m'}$. Track $1_{a2}$ connecting track $1_{a1}$ to track $1_{a3}$. Track $1_{a4}$ connecting track $1_{a3}$ to track $1_{a1}$.

NOTE: As an option; Method A and Method B can be used in combination simultaneously to ensure $1_m$ radius will change from $1_{r.max}$ to $1_{r.min}$ in track $1_{a2}$ and simultaneously, mass $1_{m'}$ radius will change from $1_{r.min}$ to $1_{r.max}$ in track $1_{a4}$.

NOTE: impulsive force from fluid jet $2_{j2}$ (as a part of $2_{i2}$ at $1_{a4}$) also serves as coolant and lubricant to prevent metal-to-metal contact wear between $1_{m'}$ and the physical bump $6_a$ in track $1_{a4}$.

(3) Specially designed Mass-Holding-Arm (MHA) $2_a$ holding its identical mass pair $1_m$ and $1_{m'}$. This MHA $2_a$ has a symmetrical configuration. It rotates with the rotating axis $1_s$. MHA $2_a$ has a symmetrical opening $2_b$ at its center to allow $2_a$ to simultaneously rotating with $1_s$ and oscillate in a plane perpendicular to $1_s$.

In every half rotational cycle, the MHA $2_a$ oscillates about $1_s$ in a plane perpendicular to $1_s$. This $2_a$ oscillation simultaneously changes both rotating masses' radii on $2_a$ for the following half rotation cycle. Therefore, continuing to produce the desired unbalanced centrifugal force vector components $2_{\Delta cfy}$ in the same desired +y-axis direction.

(4) The rotating mass's unbalanced centrifugal force vector components can be expressed in the desired +y-axis direction and the undesired ±x-axis directions. The undesired component forces will be cancelled out by placing a close pair of counter-rotating shafts with matching numbers of identical matching MHAs $2_a$ and identical mass-pairs. This configuration arrangement will cancel out all undesired ±x-axis force vectors components $2_{\Delta cfx}$ from both counter-rotating axes and at same time doubled the desired force vector components $2_{\Delta cfy}$ in the +y-axis direction.

(5) Independent Control of iCFP&CS DESIRED Thrust Vector's Magnitude & Direction.

(i) Each pair of parallel-counter-rotating CFP&C shafts with multiple number of identical MHAs are grouped separate into independent powered groups with selected changing of some group-shaft's RPM and/or orientation attitude alignments.

(ii) Each independent group of counter-rotating shafts $1_s$ has independent electric power $7_e$ controls.

(iii) Orientations of each pair of parallel-counter-rotating CFP&C shafts are either fixed orientations or at controllable-shaft axes-orientations relative to the craft's structure frame.

(6) Applications of iCFP&CS
(i) VTOL-Hovering & Flying Crafts:
Taxicabs.
Personal Flying-Hovering crafts.
Mail and Packages delivery crafts.
Buses.
Scooters.
Surfboards.
Boats.
Ships
Submarines
(ii) Applications to Earth and Mars Weather Modifications:
Control solar reflector disks.
Earth and Mars weather modifications.
Electricity production: solar cells & wind on Earth and Mars
(iii) Light-up selected dark ground areas on the moon.
(iv) Human Survival on Earth:
After a spacecraft soft-landed by multiple numbers of iCFP&CSs on a selected runway-asteroid surface, reverse control of iCFP&CSs' RPMs to produce thrust vectors pushing on the asteroid to change asteroid trajectory away from hitting the earth.
(7) Business Development
(i) Aerospace recreational business.
(ii) Marine recreation business
(iii) Real estate business
(iv) Other related business: law enforcements, in air, space and underwater endeavors.
(v) Harvest mineral from asteroids endeavors.
(vi) Changing asteroid trajectory business to bring the world people closer together,

BRIEF DESCRIPTION OF THE DRAWING FIGURES

In order that the invention may be more fully understood, it will now be described, by way of example, with reference to the accompanying drawing in which: each important item in each figure will be identified by its bold first show figure number followed by letters and numbers in subscripts.

FIG. 6A illustrates the side-view of a stationary physical-bumps $6_a$ protruding out from mass $1_{m'\ lowest}$ rotating radius $2_{r3m}$.

FIG. 6B illustrates the front-view of two stationary physical-bumps $6_a$ protruding out from mass $1_{m'}$ lowest rotating part radius $2_{r3m}$.

FIG. 7A is a top view illustrating an example of iCFP&CS improved design with independent control features for control the thrust force vectors magnitudes and directions on a pair of counter rotating shafts $7_s$.

FIG. 7B is a front view illustrating an example of iCFP&CS improved design with independent control features for control the thrust force vectors magnitudes and directions FIG. 8A is a side view of a proposed future VTOLH-Flying-Car/Bus powered and maneuver controlled by multiple numbers of counter-rotating iCFPS&Cs where some $8_x$, $8_y$ or $8_z$ attitude orientations are independent selectively controlled to make their gyroscopic forces developed, during vehicle maneuvers, be included as part of desired maneuver thrust vectors' continuous calculations.

FIG. 8B is a top view of this proposed future VTOLH-Flying-Car/Bus powered and maneuver controlled by multiple numbers of counter-rotating iCFPS&Cs: $8_x$, $8_y$ and $8_z$.

FIG. 8C is a front view of this proposed future VTOLH-Flying-Car/Bus powered and maneuver controlled by multiple numbers of counter-rotating iCFPS&Cs: $8_x$, $8_y$ and $8_z$.

Figure 9B:
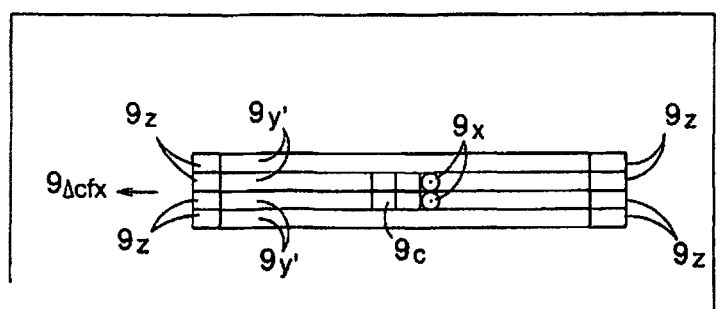
Figure 9C:
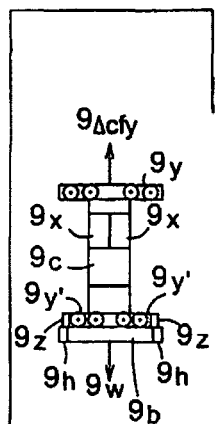
Figure 9A:
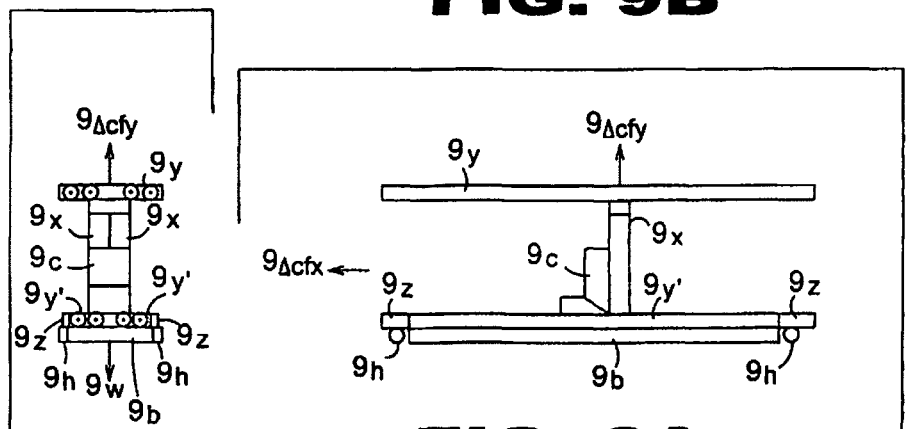

FIG. 9A is a side view illustrating applications of iCFP&CSs $9_x$, $9_y$, $9_z$ to proposed future flying craft.

FIG. 9B is a top view illustrating applications of iCFP&CSs to this proposed future flying craft.

FIG. 9C is a front view illustrating applications of iCFP&CSs to this proposed future flying craft. $9_w$ is the vehicle weight. $9_{\Delta cfy'}$ is the lift force vector produced by $9_y$ and $9_{y'}$. Vehicle forward/backward flight thrusts are produced by $9_x$ and/or by tilting $9_y$ and $9_{y'}$ from local horizontal position. $9_z$ force side movements.

FIG. 10A is the side view of CFP&CS application for submerged under water crafts powered by iCFP&CSs $10_x$, $10_y$, $10_z$ have very streamlined external shape.

FIG. 10B is the top view of CFP&CS application for submerged under water crafts powered by iCFP&CSs $10_x$, $10_y$, $10_z$.

FIG. 10c is the front view of CFP&CS application for submerged under water crafts powered by iCFP&CSs $10_x$, $10_y$, $10_z$.

FIG. 11A illustrates the use of miniaturized small iCFP&CSs $11_p$ located on the circumferences of each large solar-reflector satellite disks $11_a$ to redirect solar energy to earth $11_e$ or to other satellites $11_s$ or space ships $11_{ss}$. The redirected solar energies $11_{rr}$ to earth's atmosphere are designed to modify earth's weather and/or to produce electricity.

FIG. 11B also illustrates multiple number of scale-downed miniature iCFP&CSs $11_p$ placed on the circumference of each earth satellite solar-reflector disks to reflect the solar rays $11_{rr}$ focus at $11_o$ following trajectory $11_t$.

FIG. 11C shows multiple solar reflectors $11_a$ reflect solar rays $11_{rr}$ to their focal point $11_o$. $11_t$ are $11_o$ tracks. $11_{ss}$ is space ship and $11_s$ are earth satellites.

Note: CFP&CS controlled solar disks $11_a$ can also be placed as satellites around lunar satellite or orbits to reflect solar energy to dark and shaded lunar ground areas.

FIGS. 12A and 12B are the front and side views of a proposed totally different future space craft propulsion and control designed as one single unit system, positioned for vertical takeoff, vertical soft landings and for pushing on an asteroid to change the asteroid's trajectory by reversing $12_x$ and $12_y$ RPM's after it lands on the runway asteroid.

Note: The longitudinal thrust vector $\Sigma(12_{\Delta cfy}+12_{\Delta cfx})$ directions can be reversed by reversing by reversing $12_x$ and $12_y$ rotation RPM directions.

FIG. 12C illustrates a proposed future spacecraft design top view.

DESCRIPTION OF THE REFERENCED NUMERALS

Acronyms & Definitions of Drawing Labels

CFP&C: Centrifugal Force Propulsion and Control
CFP&CSs: each CFP&CS has one independent RPM control.
iCFP&CS: each iCFP&CS has one or more pairs of independently controlled counter-rotating $1s$. Most $1s$ are aligned along $7s$.
iCFP&CS: each iCFP&CS can have a few independently controlled CFP&CSs.
H&F: Hovering and Flying.
H&FC: Hovering & Flying Craft.
VTOL: Vertical Take Off and Landing.
VTOLHF: VTOL Hovering and Flying.
VTOLHFC: VTOL Hovering and Flying Craft.
VTOLHFCs: VTOLHF Crafts
aVTOLHFC: autonomous VTOLHFC.
aVTOLHFCs: aVTOLHF Crafts.
MHA: Mass Holding Arm is a symmetrical rod holds one of its two identical masses at its tips and to rotate these masses CG following a asymmetric track and oscillate them together perpendicular about the rotating shaft as a single unit. Each MHA oscillation changes its center of rotation, therefore changes both masses' rotating radii.
pVTOLHF-C: personal VTOLHF-Craft.
VTOLHF-S: VTOLHF scooter.
VTOLHF-B: VTOLHF-Surfboard.
R-SUBM: Recreational Submarine.

NOTE: Each important item is labeled by its FIRST time SHOWING or SECOND time SHOWING FIGURE NUMBER in bold-face followed by subscripted letter(s) and/or symbol(s).

Figure 2:
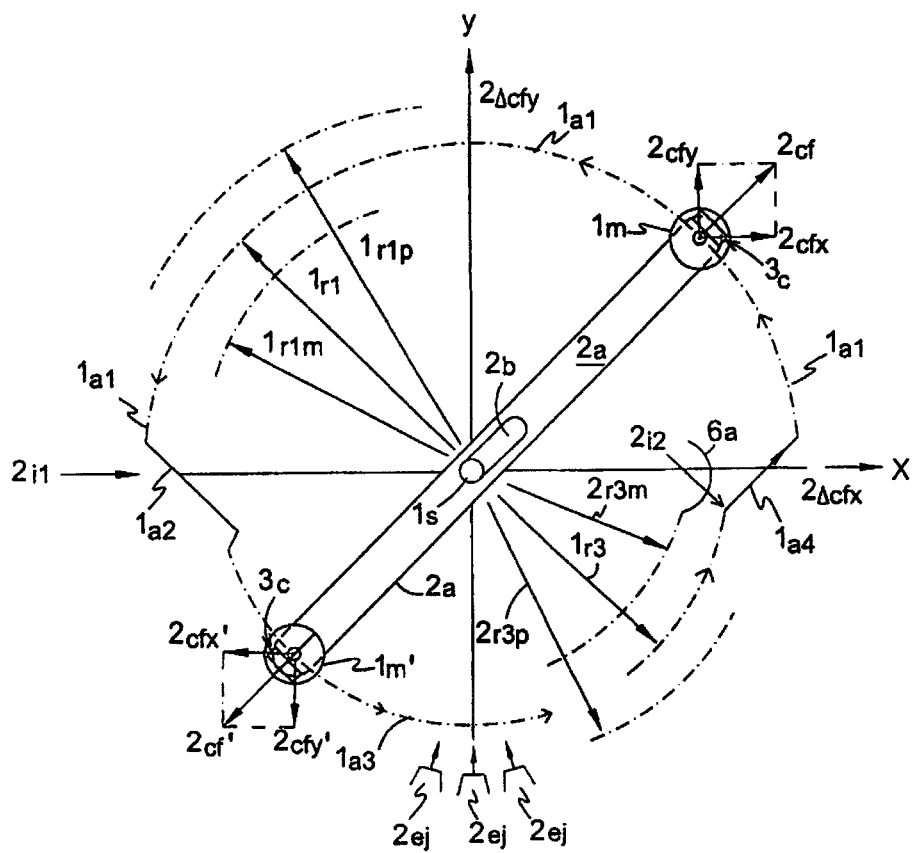
FIG. 2 shows symmetrical arm MHA $2_a$ holding two identical masses $1_m$ and $1_{m'}$ 180 degrees apart on opposite ends of $2_a$.

Example: - - - $2_b$ first shown in FIG. 2 to identify the opening in the middle of MHA $2_a$.
Example: - - - $8_a$ in first shown in FIG. 8 to identify the iCFP&CSs as $8_a$ on top of a VTOLHF car.
Example: - - - $2_a$ in FIG. 4 identify MHA as $2_a$ first shown in FIG. 2.
Example: - - - $2_{i1}$ in FIG. 2 identifies impulsive force vector acting on $1_m$ at $1_{a2}$.
Example: - - - $12_{ccwz}$ in FIG. 12 identifies iCFP&CSs also labeled as $12_z$, $12_{ccwz}$ which controls the space craft's CCW roll maneuver.

Turning to the drawings, in which similar reference characters denote similar elements throughout the several views, the figures illustrate the use of the present invention. With regard to the reference numerals used, the following numbering is used throughout the various drawing figures.

Figure 1:
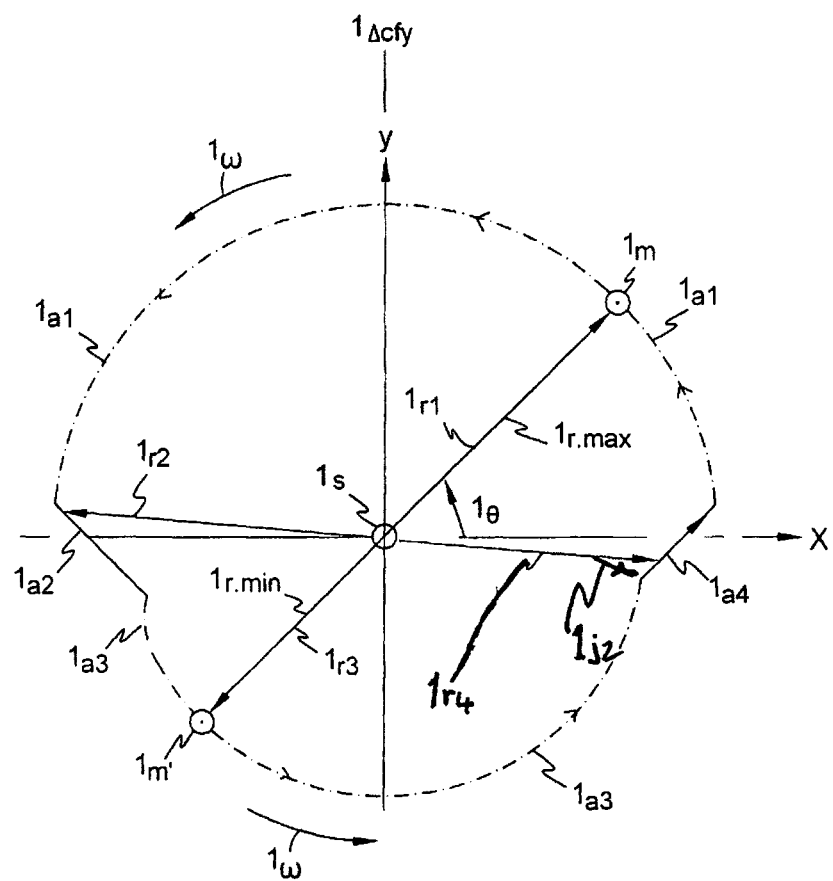
FIG. 1 illustrates the Centrifugal Force $1_{\Delta cfy}$ Propulsion & Control System (CFP&CS) basic concept.

$1_a$ Any asymmetrical 2-dimensional track expressed in (x, y) 2-D plot. This $1_a$ track must be symmetrical about y-axis and not symmetrical about x-axis. Label $1_a$ is NOT shown in FIG. 1. Only the 4 components of $1_a$ are shown in FIG. 1.

Track $1_a$ is represented by its four components as:
$1_a=(1_{a1}+1_{a2}+1_{a3}+1_{a4})$ in the rotation from $1_{a1}$ to $1_{a4}$ and back to $1_{a1}$.
$1_{a1}$ The large half-circle of radius ($1_{r1}=1_{r.max}$) above the x-axis & symmetrical about y-axis.
$1_{a2}$ The track connecting from $1_{a1}$ at $(-x, +y\approx0)$ to $1_{a3}$ at $(-x,-y\approx0)$.
$1_{a3}$ The smaller half-circle of radius ($1_{r3}=1_{r.min}$) below the x-axis & symmetrical about y-axis.
$1_{a4}$ The track connecting from $1_{a3}$ at $(+x, -y\approx0)$ to $1_{a1}$ at $(+x>0, +y\approx0)$.
$1_m$ One of a pair of identical mass on $2_a$ when it is at constant maximum rotating radius $1_{r.max}$.
$1_{m'}$ One of a pair of identical mass on $2_a$ when it is at constant minimum rotating radius $1_{r.min}$.
$1_s$ The rotating shaft.
$1_\omega$ rotation shaft $1_s$ rotation rate.
$1_{r1}$ radius of $1_m$ measured from $1_s$ to track $1_{a1}$ (Note: $1_{r1}=1_{r.max}$).
$1_{r2}$ radius of $1_m$ measured from $1_s$ to track $1_{a2}$. (Note: $1_{r3}\leq1_{r2}\leq1_{r1}$)
$1_{r3}$ radius of $1_{m'}$ measured from $1_s$ to track $1_{a3}$. (Note: $1_{r3}=1_{r.min}$)
$1_{r4}$ radius of $1_{m'}$ measured from $1_s$ to track $1_{a4}$. (Note: $1_{r3}\leq1_{r4}\leq1_{r1}$)
$1_\theta$ rotation angle of $1_r$.
$1_{r.max}$ maximum $1_a$ radius. measured from $1_s$ to $1_m$ mass-center at $1_{a1}$.
$1_{r.min}$ minimum $1_a$ radius measured from $1_s$ to $1_{m'}$ mass-center at $1_{a3}$.
$1_{\Delta cfy}$ desired unbalance thrust force component in +y-axis direction.
NOTE: $1_{\Delta cfy}=2_{\Delta cfy}$.
$2_a$ Mass-Holding-Arm (MHA $2_a$) is perpendicular to $1_s$.

$2_b$ a symmetrical opening at center of MHA to allow $2_a$ to simultaneously rotating with $1_s$ and oscillate perpendicular to $1_s$ every half rotation cycle to change ($2_a$)'s rotation center.

$2_{r1p}$ highest radial distance from $1_s$ to most top part of $1_m$.

$2_{r1m}$ lowest radial distance from $1_s$ to the lowest part of $1_m$. (Note: $2_{r1m} < 1_{r1} < 2_{r1p}$).

$2_{r3p}$ highest radial distance from $1_s$ to most top part of $1_{m'}$.

$2_{r3m}$ lowest radial distance from $1_s$ to lower part of $1_{m'}$. (Note: $2_{r3m} < 1_{r3} < 2_{r3p}$).

$2_{cf}$ Centrifugal force vector from rotating mass $1_m$ CG.

$2_{cfx}$ x-axis component of $2_{cf}$.

$2_{cfy}$ y-axis component of $2_{cf}$.

$2_{cf'}$ Centrifugal force vector from rotating mass $1_{m'}$ CG.

$2_{cfx'}$ x-axis component of $2_{cf'}$.

$2_{cfy'}$ y-axis component of $2_{cf'}$.

$2_{\Delta cfy}$ Desired unbalanced centrifugal force components in the +y-axis direction. (Note: ($1_{\Delta cfy} = 2_{\Delta cfy} = (2_{cfy} - 2_{cfy'}) > 0$)).

$2_{\Delta cfx}$ Undesired unbalanced centrifugal force components in the ±x-axis directions. (Note: ($2_{\Delta cfx} = (2_{cfx} - 2_{cfx'}) \leq 0$ or $\geq 0$)).

$2_i$ Impulsive forces vector. ($2_i$ not show in FIG. 2)

$2_{i1}$ $2_i$ @ track $1_{a2}$ ($2_{i1}$ as $2_i$)

$2i_2$ $2_i$ @ track $1_{a4}$ ($2_{i2}$ as another $2_i$) from $6_a$ & $2_{j2}$.

$2_j$ high-pressure fluid jet impulsive force ($2_j$ as $2_i$).

$2_{j1}$ $2_j$ @ track $1_{a2}$.

$2j_2$ $2_j$ @ track $1_{a4}$ as part of $2_{i2}$.

$2_e$ electric-magnetic impulsive force vector ($2_e$ as $2_i$).

$2_{e1}$ $2_e$ @ track $1_{a2}$.

$2_{e2}$ $2_e$ @ track $1_{a4}$ as part of $2_{i2}$.

$2_{ej}$ electric magnetic or jet force apply on $3_c$ pushing $1_{m'}$ up toward +y-axis when $1_s$ start rotating at low RPMs $2_{i1}@i_{a2}$ Impulsive force vector $2_{i1}$ applied at track $1_{a2}$.

$2_{i2}@1_{a4}$ Impulsive force vector $2_{i2}$ applied at track $1_{a4}$.

$2j_1@1a_2$ Impulsive force $2_i$ from pressure jet $2_{j1}$ at $1_{a2}$.

$2_{j2}@1_{a4}$ Impulsive force $2_i$ from pressure jet $2_{j2}$ at $1_{a4}$.

$2_{e1}@1_{a2}$ Impulsive force $2_i$ from $2_{e1}$ at track $1_{a2}$.

$2_{e2}@i_{a4}$ Impulsive force $2_i$ from $2_{e2}$ at track $1_{a4}$.

NOTE: ($2_{i1} \approx 2j1 \approx 2e1$ applied at track $1a2$) and ($2_{i2} > 2_{j2} \approx 2_{e2}$ applied at track $1_{a4}$).

$3_a$ Disks rotate with $1_s$ and on either sides of each MHA $2_a$.

$3_b$ One roller $3_b$ attached to each $3_a$ to force rotate MHA $2_a$ in CW or CCW directions.

$3_c$ Flat surface $3_c$ at tips of $2_a$ are to receive jets $2_{j1}$ as $2_{i1}$ @ tract $1_{a2}$ and receive $2_{ej}$ @ $1_{a3}$ during low RPM. This $2_{j1}$ is designed to assisting the $6_a$ effort to change both rotating masses radii in very short time inside tracks $1_{a2}$ for $1m$ and inside track $1_{a4}$ for $1_{m'}$.

$3_{bs}$ Small shaft holding each rotating $3_b$ on $3_a$.

$4_{\Delta cfy}$ Double the desired thrust vectors y-axis component from this pair of counter rotating parallel shafts. (NOTE: $4_{\Delta cfy} = ((2_{cfy} - 2_{cfy'}) + (2_{cfy} - 2_{cfy'})) > 0$. The number "4" also represent this "doubled desired force vector" is first labeled in FIG. 4.

$4_{\Delta cfx}$ Balanced undesired thrust force components in the ±x-axis directions = $(-2_{fx} + 2_{fx'}) = 0$.

$4_p$ High-pressure fluid (of air, water, oil, etc.) tank.

$4_e$ Electric-pumps to recycle fluid back to $4_p$ and to maintain pressure in $4_p$.

$4_q$ pressure line from $4_p$ to $2_{j1}@1_{a2}$ and to $2_{j2}@1_{a4}$. (Not shown $4_q$ details to avoid clutter).

$4_k$ Fluid enclosure to keep all fluid inside (Not shown $4_k$ details to avoid clutter).

$6_a$ physical bump to make contact with roller-shaped $1_{m'}$ (FIGS. 3 & 5) near the starting point of track $1_{a4}$. The impulse force $2_{i2}$ from $6_a$ on $1_{m'}$ is designed to force $1_{m'}$ to increase its rotating radius from $1_{r3} = 1_{r.min}$ towards $1_{r1} = 1_{r.max}$ inside track $1_{a4}$ in very short time.

The $6_a$ protractions rate will be zero or minimum during low $1_s$ shaft RPM. As required thrust force increases by increasing $1_s$ RPM and increase $6_a$ protrusions from track $2_{r3m}$. $6_a$ protrusions decrease as required thrust force level decreases along with decreasing $1_s$ RPM.

$6_b$ Structure frame holding bump $6_a$ fixed on CFP&CS structure $5_c$.

$7_a$ A typical group of counter-rotating parallel shafts, with identical numbers of matching MHAs $2_a$ on each group's parallel shafts. All counter rotating shafts $1_s$ in all $7_a$ groups are aligned into two parallel shafts labeled as $7_s$. Different size of $7_a$ groups' parallel shafts are aligned along one pair of parallel shafts labeled $7_s$. Different sized $7_a$ group on parallel shaft $7_s$ are separated by independent supports $7_n$ connected to the structure frame $7_k$.

$7_g$ Gear train to ensure independent counter rotating shafts $1_s$ in each $7_a$ group.

$7_e$ Independently controlled electrical motor to drive one pair of $1_s$ shaft in each $7_a$ group.

$7_n$ Rollers holding each $7_a$ group's two $1_s$ shafts. For special controllable $7_n$ to control $9_z$ attitude orientation.

$7_s$ Two parallel shafts having identical number of independent counter rotating $7_a$ groups of MHA $2_a$ and separated by $7_n$ at each $7_a$'s independent group of counter-rotating shaft $1_s$ ends. Each $7_s$ has one or more $1_s$ counter-rotating groups, all $1_s$ are aligned along $7_s$ during non-attitude-changing flights.

$7_k$ iCFP&CS structure frame connected to and supporting all $7_n$.

$7_{\Delta cfy}$ Desired unbalanced centrifugal force vector from all rotating masses on both counter-rotating shafts $7_s$ in the +y-axis direction.

$7_{\Delta cfx}$ Undesired unbalanced centrifugal force component from all rotating masses on both counter-rotating shaft $7_s$ in the ±x-axis directions.

$8_y$ Illustrate a minimum of two sets of iCFP&CSs. Each $8_y$ set consists one to multiple numbers of matching $7_a$ on roof top of this flying-car/bus (VTOLHF-C/B).

$8_x$ Illustrate a minimum of two sets of iCFP&CSs with their rotating axes $7_s$ perpendicular to set $8_y$'s rotating axis $7_s$ during operations without vehicle attitude changes.

$8_z$ A minimum of two sets of iCFP&CSs with their rotating axes $7_s$ perpendicular to both $7_s$ of $8_x$ and $8_y$ in non-attitude-changing flights.

$8_p$ Battery packages.

$8_c$ Passengers seats.

$8_{\Delta cfx}$ Forward thrust force from $8_x$. Also $\pm 8_{\Delta cfx}$ thrust force vectors can move forward or backward $8_y$ tilt for local horizontal position.

$8_{\Delta cfy}$ Lift-force from $8_y$.

$8_{wt}$ Flying-taxicab weight. NOTE: $8_{\Delta cfy} > 8_{wt}$ ascending, $8_{\Delta cfy} = 8_{wt}$ hovering, $8_{\Delta cfy} < 8_{wt}$ descending.

$8_p$ Battery package or electricity power source.

$8_h$ retractable wheels for ground support and assist ground steering.

$9_x$ FIG. 9A is a side-view, Illustrating a sets of iCFP&CSs $9_x$. Each $9_x$ consists multiple numbers of matching $7_a$ with their controllable $1_s$ align and labeled as $7_s$ axes in local vertical position to provide forward thrust force in normal flights without vehicle attitude changes.

$9_y$ FIG. 9B is a top-view from below $9_y$, illustrating multiple pairs of iCFP&CSs labeled as $9_{y'}$ and perpendicular to $9_x$. Both sets of $9y$ and $9_{y'}$ consist of multiple even numbers of iCFP&CSs to provide lift force and forward/backward thrusts when this craft is tilted from local horizontal position in non-attitude-changing flights.

$9_z$ FIG. 9C Illustrate front-view of this VTOLHFC. Even number of iCFP&CSs labeled as $9_z$ may be installed in front and behind $9_x$ for control maneuvers.

$9_c$ Seats.

$9_{\Delta cfx}$ thrust force in the +x-axis forward direction from $9_x$.

$9_{\Delta cfy}$ Lift force from $9_y$ and $9_{y'}$.

$9_{\Delta cfz}$ Side force from $9_z$.

$10_y$ Each $10_y$ are iCFP&CSs located on this craft. The $10_y$ rotating parallel shafts $7_s$ are normally parallel to the R-Submarine's structure longitudinal axis: where ±x-axis is the local horizontal forward and backward directions. These axial orientations can be controlled relative to vehicle structure frame and/or relative to local horizontal during vehicle maneuvers.

$10_x$ Consists even pairs of multiple-numbers of iCFP&Cs with their parallel rotating axes $7_s$ in the local vertical direction and perpendicular to the $10_y$'s rotating axes direction $7_s$ during vehicle non-rotational maneuver operations.

$10_z$ Consist of even pairs of multiple numbers of iCFP&CSs with their rotating axes $7_s$ perpendicular to $7_s$ of both $10_x$ and $10_y$ during non-attitude changing maneuver operations.

$10_b$ Battery pack.

$10_a$ Work space.

$10_{\Delta cfx}$ Forward thrust force.

$10_{\Delta cfz}$ Maneuver thrust force.

$10_{\Delta cfy}$ Upward thrust force.

$10_w$ Weight.

$11_a$ Solar reflector satellite disk.

$11_u$ Solar-Disk's desired-attitude orientation direction.

$11_v$ Solar-Disk's desired-moving direction.

$11_b$ Electricity storage pack.

$11_c$ On board computer.

$11_r$ Receiver and transmitter.

$11_p$ Miniaturized iCFP&CS.

$11_k$ Solar ray from sun to $11_a$.

$11_{rr}$ Reflected solar ray from solar disk $11_a$ to $11_0$.

$11_e$ Earth.

$11_{sun}$ Sun.

$11_0$ $11_a$ reflected solar rays $11_{rr}$ focus point.

$11_t$ Desired $11_0$ trajectory.

$11_{ss}$ Space craft or Solar-Sail craft.

$11_s$ Satellite trajectory.

$12_x$ Multiple pairs of counter-rotating and closely-paralleled iCFP&CSs with one or more pairs of independent parallel counter-rotating axis $1_s$ inside $7_s$ in local horizontal positions perpendicular to local gravity vector. The developed thrust vectors $12_{\Delta cfx}$ from $12_x$ is along spacecraft's longitudinal +y-axis for normal, no-attitude-changing, flights.

$12_y$ Multiple pairs of counter-rotating and closely-paralleled iCFP&CSs with one or more pairs of independent parallel counter-rotating axes $1_s$ inside $7_s$ in local horizontal position and perpendicular to local gravity vector and perpendicular to $7_s$ of $12_x$.

$12z$ Multiple pairs of counter-rotating and closely-paralleled iCFP&CSs with their rotating axes $7_s$ parallel with spacercraft's longitudinal axis and perpendicular to the rotating shafts $7_s$ of both $12_x$ and $12_y$. Controlling RPM of selected $12_z$ controls the space craft CW/CCW roll rotations.

The developed thrust vectors from $12_x$ and $12_y$ are designed for vertical take-off from ground and vertical landings braking maneuvers. Simultaneously controlled change of selected $12_x$, $12_y$ and $12_z$ RPMs and their rotational axial attitude changes control spacecraft's heading directions.

$12_{cwz}=12_z$ positioned to provide thrusts for CW roll rotations about spacecraft longitude axis.

$12_{ccwz}=12_z$ positioned to provide thrusts for CCW roll rotations about spacecraft longitude axis.

$12_n$ Power storage.

$12_c$ Work and payload spaces.

$12_d$ Ground.

$12_g$ Spacecraft ground support before take-off.

$12_e$ Ground power storage for ascent take-off power.

$12_h$ Solar-panels to receive solar energy $11_{rr}$ resupplies to $12_e$ from multiple numbers of $11_a$.

$12_{cwr}$ For space-craft longitudinal-axis CW roll rotations by $12_{cwr}=12_z$.

$12_{ccwr}$ For space-craft longitudinal-axis CCW roll rotations by $12_{ccwr}=12_{z''}$.

$12_{\Delta cfy}$ Thrust from $12_y$ iCFP&CSs for spacecraft vertical power-ascent and power-descent thrusts.

$12_{\Delta cfx}$ Thrust from $12_x$ iCFP&CSs for spacecraft vertical power-ascent and power-descent thrusts.

$12_{\Delta cfz}$ Thrust from $12_z$ iCFP&CSs for spacecraft roll-controls.

$\Sigma(12_{\Delta cfx}+12_{\Delta cfy})$: Combined thrust from all $12_x$ and $12_y$.

$12^*$ Ideal point high above +y-axis where extensions of thrust vectors $12_x$ and $12_y$ intercept.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 illustrates the Centrifugal Force Propulsion & Control System (CFP&CS) basic concept. The important item in FIG. 1 is a typical close-looped two-dimensional asymmetrical track labeled $1_a$ This $1_a$ has variable radius distance $1_r$ measured from rotating shaft $1_s$ to $1_a$, where $1_{r.min} \leq 1_r \leq 1_{r.max}$ are the maximum and minimum radii from $1_s$ to $1_a$.

Track $1_a$ is represented in a 2-dimensional x-axis and y-axis plane plot on FIG. 1: Track $1_a$ is designed to be symmetrical about the y-axis. However, $1_a$ is designed to be not symmetrical about the x-axis. And the desired thrust vector, labeled $1_{\Delta cfy}$, is designed to be the positive component of the unbalanced centrifugal forces from both $1_m$ and $1_{m'}$ in the +y-axis direction.

Track $1_a$ is represented by its 4 components. They are labeled as $1_{a1}$, $1_{a2}$, $1_{a3}$ and $1_{a4}$ in FIG. 1 in place label $1_a$.

(a) $1_{a1}$ is the top large half-circular-shaped track of FIG. 1.

For example: radius at $1_{a1}$ ($\delta \leq \theta \leq \pi-\delta$) can be as:

$1_{r1}@a1(\delta \leq \theta \leq \pi-\delta)=R_0(1+\eta)*Sin(\delta \leq \theta \leq \pi-\delta)$, Where: $\delta<20$, $\eta \approx 30\%$ and $R_0$=a constant.

(b) $1_{a3}$ is the bottom small half-circular-shaped track of FIG. 1.

For example: radius $1_{a3}$ ($\pi-\delta \leq \theta \leq 2\pi+\delta$) can be as:

$1_r@a_3(\pi-\delta \leq \theta \leq 2\pi-\delta)=R_0(1-\eta)*Sin(\pi-\delta \leq \theta \leq 2\pi-\delta)$, (c) $1_{a2}$ is the short track at $((\pi-\delta) \leq \theta \leq (\pi+\delta))$ connecting $1_{a1}$ to $1_{a3}$.

(d) $1_{a4}$ is the short track at $((2\pi-\delta) \leq \theta \leq (2\pi+\delta))$ connecting $1_{a3}$ to $1_{a1}$.

Note: $1_a$ can have other asymmetric shapes, such as an ellipse, etc.

FIG. 2 shows Mass-Holding-Arm (MHA, $2_a$) a symmetrical arm MHA holds two identical masses $1_m$ and $1_{m'}$ 180 degrees apart on opposite ends of each $2_a$. These two identical masses are labeled differently in all figures to help clarify the descriptions. A mass will be labeled as $1_m$ when it rotating on track $1_{a1}$ at maximum rotating radius $1_{r.max}$. The same mass will be labeled as $1_{m'}$ when it is rotating on track $1_{a3}$ at minimum rotating radius $1_{r.min}$. These mass labels are used in all figures. The actual size and shape of these masses are illustrated in FIG. 3 for respond to different types of impulse force vectors $2_{i1}$ and $1_{i2}$ and in contact with different shapes of the resistance bump $6_a$ acting on them.

Another important item shown in FIG. 2 is the symmetrical opening labeled $2_b$ on $2_a$. This opening $2_b$ allows MHA to simultaneously rotate-about shaft $1_s$ and oscillating, in a plane, perpendicular to the rotating axis $1_s$.

Each $2_a$ oscillation is triggered by specially designed bump $6_a$ at track $1_{a4}$ and assisted by impulsive force vectors labeled $2_{i1}$ and $2_{i2}$ at specified locations on tracks $1_{a1}$ and $1_{a4}$ respectively.

Each MHA $2_a$ oscillations simultaneously changing the rotation radii $1_r$ of both masses on the same $2_a$: Mass $1_m$ changing in track $1_{a2}$ and mass $1_{m'}$ changing in track $1_{a4}$. During MHA $2_a$ oscillation the mass $1_m$ at track $1_{a2}$ will decreasing its rotation radius from $1_{r.max}$ to $1_{r.min}$ as this $1_m$ moving to track $1_{a3}$, its label will be changed to $1_{m'}$. At this same time, the mass $1_{m'}$ in track $1_{a4}$ will increase its rotation radii from $1_{r.min}$ to $1_{r.max}$ and then changing its label to $1_m$ as it moving to track $1_{a1}$.

FIG. 2 shows two locations of the two impulsive forces $1_{i1}$ and $1_{i2}$ designed to simultaneously help changing both masses' rotating radii by changing $2_a$'s rotation shaft $1_s$ center.

Two different methods produce these impulsive forces. These methods labeled as Method A and Method B are described as follows:

Method A involves a small physical bump, labeled as $6_a$ protruding out from track $2_{r3m}$ at the starting point of track $1_{a4}$ with rapid increasing slope as illustrated in the FIG. 2 and FIG. 6A. The $6_a$ protraction distance is designed as function of $1_s$ RPM and trust requirement.

When the fast rotating $1_{m'}$ in contact with this $6_a$ at track $1_{a3}$, $6_a$ will pushes $1_{m'}$ away from its rotating radius $1_{r.min}$ towards $1_{r.max}$. At the same time, the mass $1_m$ at track $1_{a2}$ will decrease its rotating radius from $1_{r.max}$ towards $1_{r.min}$.

NOTE: This technique requires tests to find the best $6_a$ shape, the $6_a$ protraction rate and location for best rotating roller shaped masses $1_{m'}$ and $1_m$, etc.

Method B1 involves the use of location-fixed high-pressure fluid-jet force $2_{j1}$ to produce the required impulsive-force vectors $2_{i1}$ in tracks $1_{a2}$, where the fast-rotating mass $1_m$ will be pushed away when it hit the stationary $2_{j1}$ in track $1_{a2}$. Therefore, pushing, or assisting $6_a$ changing, $1_m$ rotating radius from $1r$.max to $1r$.min in very short time before exiting track $1a_2$. At this same short time, mass $1m'$ in track $1a_4$ will increase its radius from $1_{r.min}$ to $1_{r.max}$ in track $1_{a4}$ and moving into track $1_{a1}$.

Method B2 involves the use of location-fixed high-pressure fluid jet force $2_{j2}$ out from inside $6_a$ to produce an additional push to assist the impulsive-force vector $2_{i2}$ in tracks $1_{a4}$ on mass $1_{m'}$.

NOTE: Fluid jet $1_{j2}$ also serves to prevent metal contact wear between the physical bump $6_a$ and $1_{m'}$. In addition, $1_{j2}$ serves as both a lubricant and a cooling agent. Method A and Method B can be used in combination to ensure the required changing masses rotating radii in very short time every half rotation cycle inside tracks $1_{a2}$ and $1_{a4}$.

FIG. 2 also illustrates each mass's centrifugal force vectors components expressed in the x-axis and y-axis directions. They are labeled as $2_{fx}$ and $2_{fy}$ for mass $1_m$ and $2_{fx'}$ and $2_{fy'}$ for mass $1_{m'}$. The desired unbalanced centrifugal force component is labeled $2_{\Delta cfy}=(2_{fy}-2_{fy'})>0$, where $2_{\Delta cfy}=1_{\Delta cfy}$. They are the same unbalanced centrifugal force vector component in the +y-axis direction. The undesired force vector components in the ±x-axis directions $2_{\Delta cfx}=(2_{fx}-2_{fx'})$ ≠0 will be cancelled out by using counter-rotating masses technique described in FIG. 4.

Figure 3C:
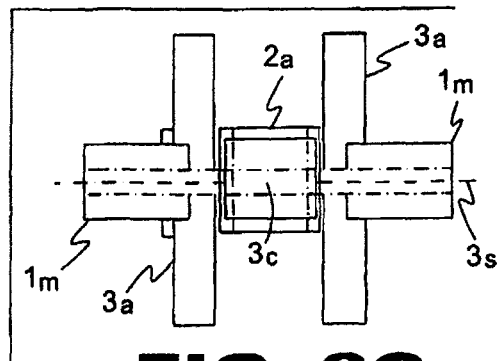
FIG. 3C illustrates the top view of a roller and a flat shape $1_m$ and $1_{m'}$ to allow SIMULTANEOUSLY response to different types of impulsive forces from $6_a$ and pressure jet $2_{i1}$.
Figure 3A:
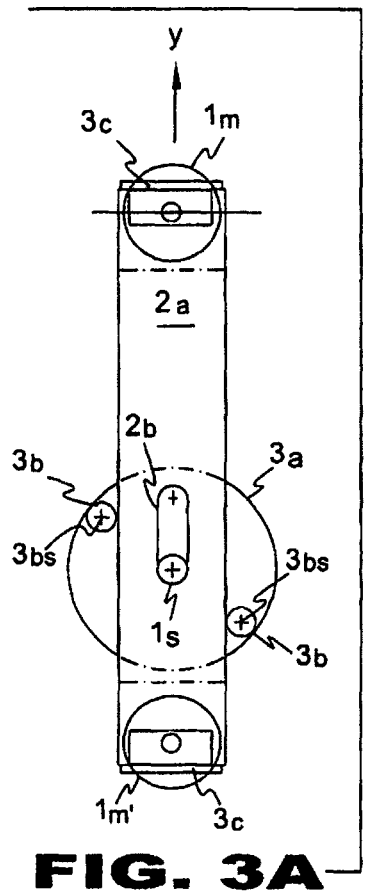
FIG. 3A is the front view illustrates combined two different shapes of each rotating mass on MHA $2_a$ to allow SIMULTANEOUS response to at $2_{i1}$ and $2_{i2}$.
Figure 3B:
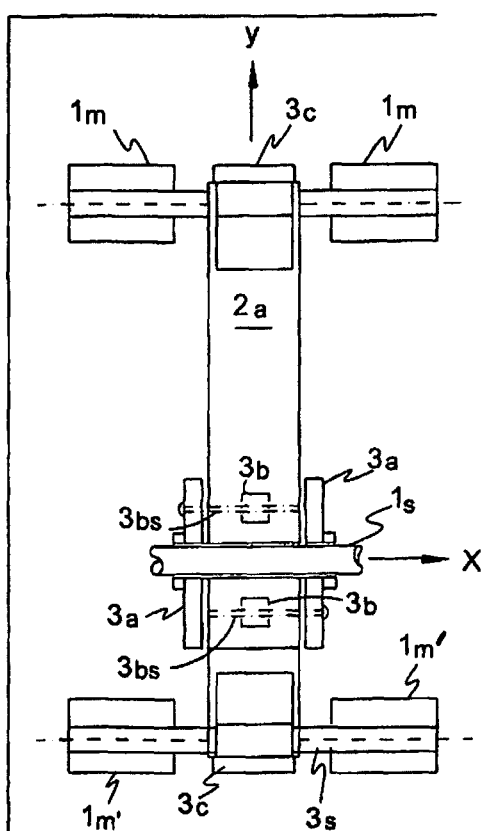
FIG. 3B illustrates combining two different shapes of each rotating mass as sum of a of roller shape and a flat surface $3_c$. Each roller and each flat surface $3_c$ together are identified as $1_m$ and $1_{m'}$.

FIGS. 3A, 3B, and 3C illustrate the combined two different shapes for each rotating mass for SIMULTANEOUSLY response to different types of impulsive forces $6_a$, $2_{i1}$ and $2_{i2}$.

Label $3_c$ illustrate flat surfaces on $2_a$ tips designed to in contact with high-pressure fluid jets $2_{j1}$ as $2_{i1}$ to change both rotating masses' rotating radii.

Also illustrated are two rotating mass of roller shape at each $2_a$ tips. These rollers are designed to be in physical contact with two stationary bumps $6_a$ (FIG. 6) to change both mass's rotating radii simultaneously. The fluid jet $2_{j2}$ can also be used to assist $6_a$ bump or use as lubricant and cooling agents with $6_a$. Also shown are the way these rotating masses $1_m$ and $1_{m'}$ are attached on their rotating Mass-Holding-Arm (MHA, $2_a$) and how each MHA is attached on the rotating shaft $1_s$.

FIGS. 3A-3C further illustrate the two disks $3_a$ holding MHA $2_a$ to rotate and oscillating at a fixed location on $1_s$. Also shown are two rollers $3_b$. Each $3_b$ attached on a $3_a$ to rotate MHA $2_a$ in either CW or CCW directions. The rotating masses $1_m$ and $1_{m'}$ are shaped as rollers in FIGS. 3A, 3B and 3C. The roller shaped mass $1_{m'}$ is designed to have $1_{m'}$ making smoother contact with bump $6_a$ (FIG. 6) at track $1_{a4}$.

Figure 4:
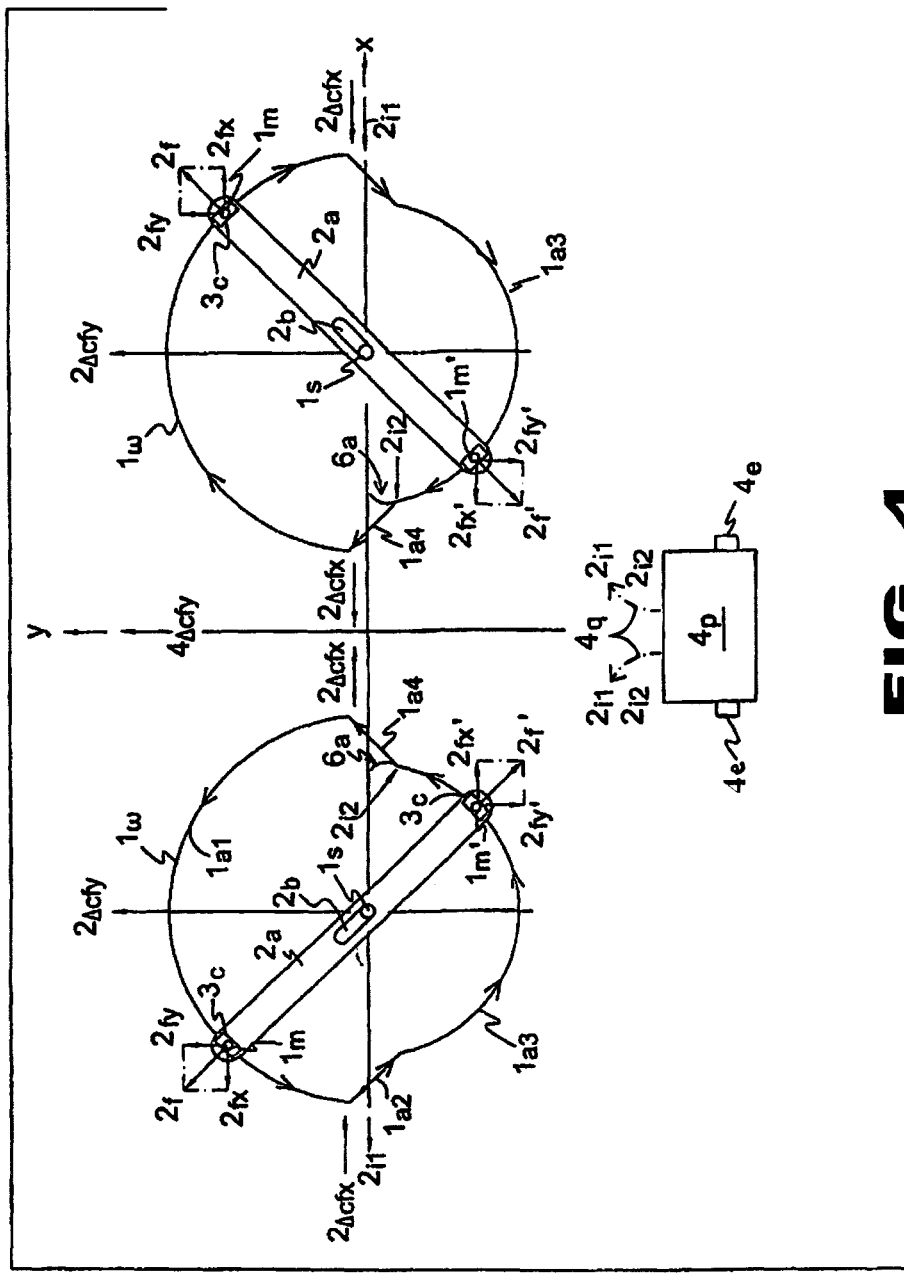
FIG. 4 illustrates the technique to cancel out the undesired centrifugal force vector components in the ±x-axis directions $\pm 2_{\Delta cfx}$ as shown in FIGS. 2 and 4.

FIG. 4 illustrates the technique to cancel out the undesired centrifugal force vector components in the ±x-axis directions as shown in FIGS. 2 and 4. This is done by closely placing a pair of counter rotating identical parallel shafts with synchronized identical matching characters and numbers of MHAs $2_a$ on each $1_s$ with identical masses. This arrangement will canceling out both counter-rotating axes' undesired centrifugal force components $2_{\Delta cfx}$ in the ±x-axis directions $\Sigma(\pm 2_{\Delta cfx})=0$ and doubling the desired net unbalanced centrifugal force $2_{\Delta cfy}$ components $2\Sigma(\pm 2_{\Delta cfy})>0$ in the desired +y-axis directions.

Also illustrated in FIG. 4 are:
(i) The four components of track $1_a$ track: $1_{a1}$, $1_{a2}$, $1_{a3}$ and $1_{a4}$.
(ii) The locations of impulse force vectors $2_{i1}$ as $2_{j1}$ and $2_{i2}$ as $2_{j2}$ described in FIG. 2.
(iii) The small protrusion $6_a$ on track $1_{a4}$ described in FIGS. 2, 5, and 6.
(iv) The labels of identical masses $1_m$ and $1_{m'}$ at $1_{r.max}$ and $1_{r.min}$ respectively.
  $4_{\Delta cfy}$ is a balanced desired thrust component in the +y direction=$\Sigma 2(2_{fy}-2_{fy'})>0$.
  $4_{\Delta cfx}$ is a balanced undesired thrust component in the ±x direction=$\Sigma 2(2_{fx}-2_{fx'})=0$.

Figure 5:
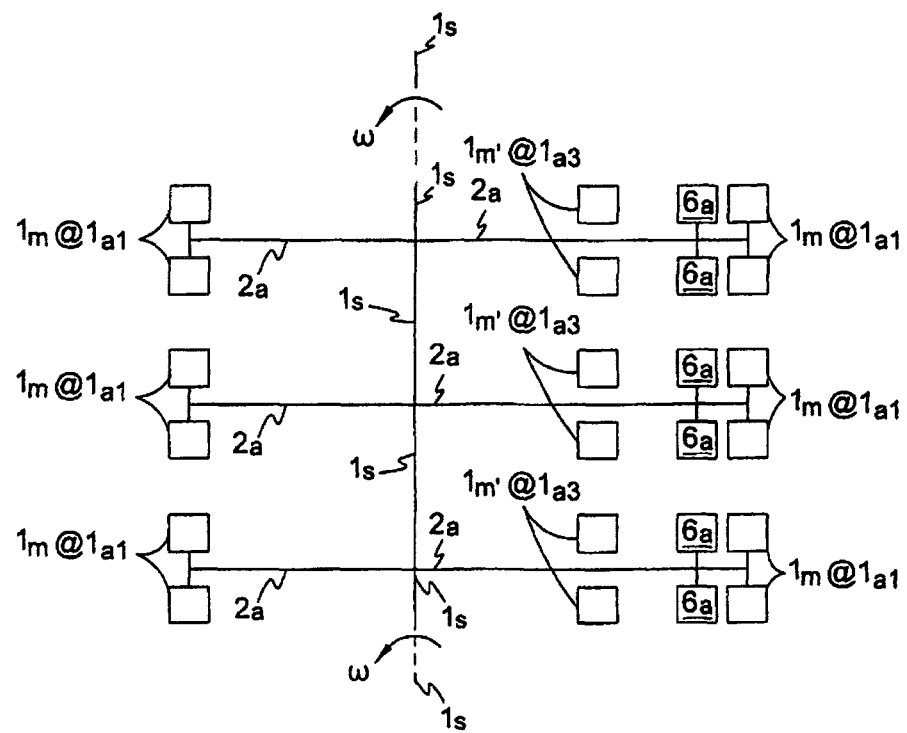
FIG. 5 illustrates the use of two physical bumps $6_a$ to increase $1_{m'}$ rotating radius.

FIG. 5 illustrates multiple numbers of MHA $2_a$ on a rotating shaft $1_s$ with rotating masses shaped as rollers on either side of each $2_a$ tips. The two $1_{m'}$ rotating on track $1_{a3}$ will be in contact with two stationary $6_a$ in track $1_{a4}$ and to force $1_{m'}$ move to track $1_{a1}$ and changing its label to $1_m$ as illustrated on the right side of FIG. 5 MHA $2_a$. Each $2_a$ has two roller-shaped mass $1_{m'}$ at the end of track $1_{a3}$ just before contact with their respective $6_a$. After the $1_{m'}$ and $6_a$ contact, the $1_{m'}$ will be pushed to increase their radius from $1_{r.min}$ to $1_{r.max}$ and moved to track $1_{a1}$.

FIGS. 6A and 6B illustrate the side-view and front-view of stationary physical-bumps $6_a$ protruding out from mass $1_m$, lowest rotating part radius $2_{r3m}$. These stationary bumps $6_a$ will force $1_m$, changing its mass-center's rotating radius, increasing from $1_{r3}=1_{r.min}$ to $1_{r1}=1_{r.max}$ inside track $1_{a4}$. NOTE: Another $6_a$ like "bump" can also be made from high-pressure fluid-jet $2_{j1}@1_{a2}$ at track $1_{a2}$ to assist forcing $1_m$ radius reduction from $1_{r1}$ towards $1_{r3}$. This $6_a$ like "bump" @ $1_{a2}$ also assisting fluid jet $2_{j2}@1_{a4}$ to increase $1_m$, rotating radius from $1_{r3}$ to $1_{r1}$ in track $1_{a4}$.

NOTE: The rotating mass $1_m$, also producing an impulse force component $-2_{i2}@1_{a4}$ on $6_a$ having a +y-axis component in the desired +y-axis direction on $6_b$. This is the reason to locate bump $6_a$ at track $1_{a4}$ not at $1_{a2}$. The undesired impulsive force $2_{i2}@1_{a4}$ component on $6_a$ in the ±x-axis directions will be cancelled out by the counter rotating masses as described in FIG. 4.

NOTE: The best $6_a$ shape and location will be determined by tests at different RPMs and tests for use or not use of $2_{i2}@1_{a4}$, FIG. 7A and FIG. 7B shows one enablement to configurate multiple numbers of basic CFP&CSs into one independently controllable CFP&CS system on a parallel pair of counter-rotating shafts $7_s$, as an example, 4 MHAs $2_a$ are illustrated 45 degrees apart but multiple numbers of MHAs can be set at closer angles than 45° for smoother and higher thrust $7_{Acfv}$ outputs.

This is done by expanding the number of identical MHA $2_a$ on both counter rotating shafts of FIG. 4 and then dividing these MHAs $2_a$ on both counter-rotating shafts $7_s$ into groups (labeled $7_a$ groups are not identified in FIG. 7 to avoid clutters). Each $7_a$ group is powered by its independently controlled electric motors $7_e$ and separate from other independent $7_a$ groups by $7_n$.

Some $7_a$ rotating axes can be designed having attitudes independently controllable for the purpose of including all gyroscopic forces produced during vehicle attitude changing maneuvers in the continuous calculations of vehicle's desired-maneuver-thrust vectors.

(1) Increase Thrust Vector Magnitudes:

To increase the magnitude of desired thrust force vector $2_{Acfv}$, as described in FIGS. 2 and 4, can be done by increasing the numbers of identical MHAs $2_a$ on each pair of parallel-counter-rotating shafts $7_s$. Multiple numbers of independent $1_s$ can be lined up in pairs of parallel counter-rotating axes labeled as $7_s$.

(2) Independent Thrust Vector Magnitudes & Directions Controls:

Independent force vectors desired directions control are done by first subdivided each pair of identical-parallel-counter rotating shafts $7_s$ into independent groups of same or different sizes:

Each group is labeled $7_a$ and consisting: a separated counter-rotating-gear $7_g$, an independent electric-motor $7_e$ and structure-shaft-support-rollers $7_n$ normally connecting each group to the structure frame $7_k$. Each group's thrust vector magnitude can now be independently controlled by operating each group at different RPMs and some groups can be controlled at selected shaft attitudes orientations with respect to vehicle's structure frame. NOTE: Minimum iCFP&CS have only one-pair of independent counter-rotating shafts $1_s$. Powered by one electric motor $7_e$. In this case, both labels iCFP&CS and CFP&CS are used.

(3) Additional Technique for Independent Desired Thrust Vector Controls:

These iCFP&CSs thrust directions control will be designed to have selected numbers of iCFP&CSs' rotation axial orientations controllable. Therefore, allow all gyroscopic force vectors produced from all rotating masses be included in the desired thrust vectors calculations.

FIG. 8A is a side-view, FIG. 8B is a top-view, and FIG. 8C is a front-view illustrating a proposed future VTOLH-Flying-Car/Bus powered and maneuver controlled by multiple numbers of counter-rotating iCFPS&Cs labeled as ($8_x$, $8_y$, $8_z$).

Some of these iCFP&CSs' counter-rotating axes $7_s$ are designed at fixed orientation relative to their VTOLH-Flying-CAR/Bus's longitude-axis. Some other iCFP&CSs' orientations of their counter rotating axes $7_s$ are designed to be independently controllable relative to the craft's structure frame.

This VTOLH-Flying-Car/Bus can also be used as ground-surface transportation crafts on or above Mars or moon surfaces by either hovering or flying just a few feet above the moon or Mar ground surfaces.

Maneuver controls are done by independently controlling some RPMs and controllable rotating axes attitude orientations of selected different $7_a$ groups in $8_x$, $8_y$, $8_z$ and thereby controlling the flying-car's forward and backward $8_y$, tilt-angles from local horizontal.

Some orientation of $7_s$ rotation shafts orientations from $8_x$, $8_y$, and $8_z$ can be either fixed to or selectively controllable relative to the vehicle structure frame.

FIGS. 9A through 9C illustrates three views of proposed VTOL-Hovering/Flying-Crafts labeled as VTOLHFC without side cover and with less seats and less powerful iCFP&CSs as future recreational flying crafts. These flying crafts are capable of VTOL, Hovering and Flying maneuvers. They all have great business potentials in new recreational markets. They are labeled as: (1) Personal-VTOL-Hovering-Flying-Craft (pVTOLHF-Craft), (2) Personal-VTOL-Hovering-Flying-Scooter (pVTOLHF-Scooter) and (3) Personal-Flying-Surfboard (pVTOLHF-Surfboard). This surfboard allows the operator to use his or her weight to perform personalized surfboard maneuvers. Maneuver controls are done by shafting operator's body weight and/or by computer software to change some rotating shaft's attitudes of selected CFP&CSs relative to vehicle structure frame.

FIG. 9A is a side-view, FIG. 9B is a top-view, and FIG. 9C is a front-view. One key difference between these three types of crafts is the location of their iCFP&CSs $9_y$ are located above or below the operator and/or below craft's central of gravity: For a typical Personal-Flying-Craft (pF-Craft) or Personal-Flying-Scooter (pFScooter) their iCFP&CSs $9_y$ are on top above the operator and their $9_{y'}$ below the operator which may-or may-not be needed.

For a typical future VTOLHF/Surfboard design powered by multiple even-numbers of counter-rotating iCFPS&Cs $9_{y'}$ with their counter-rotating axes $7_s$ parallel to this Flying-Surfboard's longitudinal x-axis. These $9_{y'}$ designed for lift are located below or midway-below the operator and battery-packages. This configuration allows the operator to use his or her body-weight movement to perform personalized surfboard maneuvers to control this personalizes Flying-Surfboard. Some iCFP&CSs $9_x$, $9_y$ and $9_z$ axial attitudes are controllable to include their gyroscopic force vectors during vehicle attitude changing maneuvers.

FIG. 10 depicts application for submerged under water crafts (Submarines) powered by iCFP&CSs that can have very streamlined external shape as the one illustrated in FIG. 10. Its iCFP&CSs are attitude orientations controllable. They are labeled as ($10_x$, $10_y$, $10_z$) arrangements are similar to the Personal-Flying-Craft's iCFP&CSs arrangement for propulsion and maneuver controls described in FIG. 9.

This submarine craft can be designed to operate under and above water and can also be designed to be capable of skipping at high speed flying above water, for a short distance, to avoid large waves. Different sizes and numbers of iCFP&CSs can also be installed on large ocean-going ships or on small river crafts.

FIGS. 11A and 11B illustrate a multiple number of scale-downed miniature iCFP&CSs $11_p$ placed on the circumference of each earth satellite solar-reflector disks $11_a$. These iCFP&CSs are used for independent control of each solar reflector's position moving direction $11_v$ and their independent orientations focus point $11_o$. FIG. $11_c$ shows these miniature iCFP&CSs controlled solar reflectors redirected solar rays $11_{rr}$ following tracks $11_t$ either in earth's atmosphere or tracks $11_t$ on earth's surface or following a spacecraft $11_{ss}$ trajectory or a satellite $11_{sat}$ orbit. Also, these reflected solar rays $11_{rr}$ can resupply power to iCFP&CS on space crafts and satellites in orbits and iCFP&CS on an asteroid. Also, solar ray $11_{rr}$ can be used to push on solar-sail spacecrafts.

These reflected solar rays $11_{rr}$ are originally conceived (Reference 1) to change the thermodynamic of the affected earth's atmosphere in order to modify earth's weather in specified regions or to produce electricity.

Multiple numbers of iCFP&CS controlled solar reflection disks $11_a$ can be placed in luna satellite orbits to reflect solar ray $11_{rr}$ to selected dark or moon ground surface areas at any time and for specific durations.

FIGS. 12A through 12C illustrates a proposed totally different future space craft propulsion and control designed as one single unit system. (The details to change few selected $12_x$, $12_y$ and $12_z$ rotation axes' attitude orientations during vehicle attitude-changing maneuvers are not shown to avoid clutter). (Detailed locations of electric motors $7_e$, gears $7_g$, fluid lines $4_q$, fluid pressure tanks $4_p$, fluid containers $7_k$ and attitude controls of selected iCFP&CSs during attitude-changing maneuvers are not shown to avoid clutter.) This basic design involves assembling multiple numbers of different sizes of iCFP&CSs installed at three perpendicular orientations relative to the spaceship's structural frame to achieve the required thrust and maneuver controls by only changing the RPMs or power levels of different iCFP&CSs' $12_x$, $12_y$, $12_z$. In addition, control of a selected few iCFP&CSs' axial orientations to include all gyroscopic forces produced during vehicle attitude-changing maneuvers in the continued reiterative calculations of estimated desired maneuver thrust vectors during vehicle maneuvers.

The required electrical power comes either from nuclear-powered $12_n$ or from solar-powered electricity generator $12_e$. Solar-Reflector-Disks $11_a$ can also resupply power via $11_{rr}$ to iCFP&CSs on this space craft in orbits or during a space-craft's boost-ascent/descent flights or to space crafts parked on an asteroid to change the asteroid's trajectory via $12_h$.

The journey time to-and-from distance planets can be reduced by using iCFP&CSs for continuous thrusting during the first part of a space-craft's trajectory. Maneuvering braking-thrust from these same iCFP&CSs decreases velocity before using these same iCFP&CSs to maneuver the space craft to a planet's satellite orbit or possibly make soft-landings on an asteroid or on a plant's surface.

FIG. 12C illustrates a proposed future spacecraft design in local vertical pointing up position. Multiple numbers of mutually perpendicular iCFP&CSs $12_x$, $12_y$, $12_z$ are shown for this future spacecraft's propulsions and controls.

NOTE: Simultaneously controlled RPMs changes of one or more $7_a$ (or change $1_s$ in $7_s$) in selected $12_x$ and or $12_y$ control spacecraft's heading directions. The developed thrust forces from $12_x$ ($12_{Acfx}$) and from $12_y$ ($12_{Acfy}$) are designed for VTOL take-off, breaking and vertical landing thrusts. Thrust vector direction can be reversed by reversing the $12_x$ and $12_y$ rotational directions.

NOTE: For better ascent thrusting stability; some outer pairs of $12_x$ and $12_y$ rotating axes $7_s$ should be located at slightly different horizontal planes. This will allow all thrust force vectors $12_{Acfx}$ and $12_{Acfy}$ to intercept at an ideal point 12* high above the space craft longitudinal +y-axis.

What is claimed is:

1. An aircraft centrifugal force propulsion and control system for developing desired thrust force, comprising:
    a plurality of identical rotating and oscillating masses that develops thrust force vectors from unbalanced centrifugal force components of its oscillating and rotating identical mass-pair moving on an asymmetrical track at different rotating radii, said asymmetrical track comprising a first sub-track having a first half-circle shaped track above an x-axis, a second sub-track having a second half-circle shaped track below the x-axis, said second half-circle shaped track of said second sub-track being smaller than said first half-circle shaped track of said first sub-track, a third sub-track connecting said first sub-track to said second sub-track, and a fourth sub-track connecting said second sub-track to said first sub-track; and,
    a system of propulsion force, magnitude and direction controls to selectively change axial attitude orientation and revolution speed of said plurality of identical rotating and oscillating masses.

2. The aircraft centrifugal force propulsion and control system for developing desired thrust force as claimed in claim 1, wherein said centrifugal force propulsion and control system for developing desired thrust force having has a ±x-axis.

3. The aircraft centrifugal force propulsion and control system for developing desired thrust force as claimed in claim 2, wherein undesired unbalanced-centrifugal-force components are in the ±x-axis.

* * * * *